United States Patent [19]

LaRoche, Jr.

[11] Patent Number: 4,986,945
[45] Date of Patent: * Jan. 22, 1991

[54] METHOD FOR PRODUCING MOLD-SHAPED CERAMIC BODIES

[75] Inventor: E. Allen LaRoche, Jr., Middletown, Del. 19709

[73] Assignee: Lanxide Technology Company, LP, Newark, Del.

[*] Notice: The portion of the term of this patent subsequent to May 30, 2006 has been disclaimed.

[21] Appl. No.: 280,662

[22] Filed: Dec. 6, 1988

Related U.S. Application Data

[63] Continuation of Ser. No. 207,028, Jun. 13, 1988, Pat. No. 4,834,925, which is a continuation of Ser. No. 1,129, Jan. 7, 1987, abandoned.

[51] Int. Cl.⁵ .................................................. C04B 35/60
[52] U.S. Cl. .................................... 264/60; 264/57; 264/59; 264/65; 264/82
[58] Field of Search .................... 264/57, 59, 60, 65, 264/82; 501/98, 127, 128

[56] References Cited

U.S. PATENT DOCUMENTS

| 2,741,822 | 4/1956 | Udy | 25/157 |
|---|---|---|---|
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,789,096 | 1/1974 | Church et al. | 264/60 |
| 3,864,154 | 2/1975 | Gazza et al. | 29/123 B |
| 3,973,977 | 8/1976 | Wilson | 106/62 |
| 4,055,451 | 10/1977 | Cockbain et al. | 156/89 |
| 4,647,414 | 3/1987 | Mizuno et al. | 264/65 |
| 4,657,876 | 4/1987 | Hillig | 501/87 |

FOREIGN PATENT DOCUMENTS

| 0116809 | 8/1984 | European Pat. Off. |
| 0169067 | 7/1985 | European Pat. Off. |
| 0155831 | 9/1985 | European Pat. Off. |

OTHER PUBLICATIONS

"Oxidation of Molten Aluminium Alloys. Reaction with Refractories" by M. Drouzy and M. Richard—Mar. 1974—*Fonderie*, France, No. 332, pp. 121-128.
"Refractories for Aluminum Alloy Melting Furnaces" by B. Clavaud and V. Jost., Sept. 1980-*Trans. Lillain Brassinga*, Jan. 1985.

*Primary Examiner*—James Derrington
*Attorney, Agent, or Firm*—Mark G. Mortenson; William E. McShane

[57] ABSTRACT

A method of producing shaped, self-supporting ceramic bodies includes preparing a mold by applying a gas-permeable, conformable material to a shape-defining surface of a shaped parent metal. The gas-permeable material, when set or stable, provides a mold with a shaped surface which is defined by, and is therefore substantially congruent to, the shape-defining surface. Upon heating, the parent metal melts and flows from the mold into a receptacle without disturbing the mold. Oxidation reaction product is then grown by oxidation of the molten parent metal with a vapor-phase oxidant to form an oxidation reaction product which grows into the mold cavity and is shaped by it. A ceramic body is recovered from the mold and has substantially the same shape as the pattern section of the original shaped parent metal.

9 Claims, 2 Drawing Sheets

METHOD FOR PRODUCING MOLD-SHAPED CERAMIC BODIES

CROSS-REFERENCE TO RELATED PATENTS AND PATENT APPLICATIONS

This patent application is a continuation of U.S. application Ser. No. 207,028, filed on June 13, 1988, which issued to U.S. Pat. No. 4,834,925, on May 30, 1989, in the name of E. Allen LaRoche, Jr., and entitled "Method for Producing Mold-Shaped Ceramic Bodies". U.S. application Ser. No. 207,028, was a continuation of U.S. application Ser. No. 001,129, filed on Jan. 7, 1987, and now abandoned.

BACKGROUND OF THE INVENTION

1. Field of the Invention

The present invention relates to a method of making shaped ceramic bodies by growing an oxidation reaction product within a mold. In particular, the invention relates to a novel and improved method of making ceramic bodies having a predetermined shape or geometric configuration.

2. Commonly Owned Patent Applications

The method of growing ceramic products utilized in the present invention is generally disclosed in Commonly Owned U.S. Pat. No. 4,713,360, which issued on Dec. 15, 1987, from U.S. patent application Ser. No. 818,943, filed Jan. 15, 1986, and its ancestor applications (now abandoned), all in the names of Marc S. Newkirk et al. and entitled "Novel Ceramic Materials and Methods of Making Same". This patent discloses a method using an oxidation phenomenon to grow a polycrystalline oxidation reaction product from a parent metal at elevated temperatures in the presence of an oxidant, which growth may be enhanced by the use of a dopant or dopants alloyed into the parent metal. The disclosed method affords the production of self-supporting ceramic bodies. The method was improved upon by the use of external dopants applied to the surface of the precursor parent metal as disclosed in Commonly Owned U.S. Pat. No. 4,853,352, which issued on Aug. 1, 1989, from U.S. patent application Ser. No. 220,935, filed on June 23, 1988, as a continuation of U.S. patent application Ser. No. 822,999, filed Jan. 27, 1986, and its ancestor patent applications (now abandoned), all in the names of Marc S. Newkirk et al. and entitled "Methods of Making Self-Supporting Ceramic Materials".

The entire disclosure of all Commonly Owned Patents and Patent Applications mentioned in this specification is expressly incorporated by reference herein.

SUMMARY OF THE INVENTION

In accordance with the present invention, there is provided a method for producing a shaped, self-supporting ceramic body. The method comprises the following steps. A pattern section of a shaped parent metal is covered with a conformable, gas-permeable material in order to provide a mold having a shaped surface which is substantially congruent to the pattern section. This material is intrinsically self-bonding, at least in a support zone of the material which is immediately adjacent to and coextensive with the shaped surface. This provides a mold with sufficient cohesive strength to retain the integrity of its shaped surface under the processing conditions described below. The mold/parent metal combination and a receptacle are oriented with respect to each other to place the parent metal in flow communication with the receptacle, the capacity of the receptacle being at least sufficient to accommodate substantially all of the parent metal in molten form. The assembly is then heated to a temperature region above the melting point of the parent metal but below the melting point of its oxidation reaction product and that of the mold, and the resulting molten parent metal is evacuated from the mold into the receptacle without substantially disturbing the mold, thereby providing a mold cavity. The heating is continued in the presence of a vapor-phase oxidant and, in the aforesaid temperature region, the following steps are carried out: (1) The molten parent metal is reacted with the oxidant to form an oxidation reaction product. (2) At least a portion of the oxidation reaction product is maintained in contact with and between the body of molten metal and the oxidant, in order to progressively draw molten metal from the body thereof through the oxidation reaction product and into the mold cavity for contact with the oxidant so that oxidation reaction product continues to form at the interface between the oxidant and previously formed oxidation reaction product. (3) The reaction is continued, to grow or develop the oxidation reaction product into contact with the shaped surface of the mold, thereby forming a ceramic body whose shape is determined by the shape of the mold cavity. After steps (1)–(3) are completed, the ceramic body is recovered from the mold.

In another aspect of the invention, at least the portion of the permeable material used to form the shaped surface comprises a barrier material, thereby inhibiting growth of the oxidation reaction product at the shaped surface. Still further, the parent metal is supported above the receptacle and in flow communication therewith, e.g., in gravity flow communication, for example, by placing the shaped parent metal upon a suitable support. An expendable support placed within the receptacle is particularly useful. During heating, and also when the molten parent metal contacts the expendable support, the latter vaporizes so that entry of the molten metal into the receptacle replaces the expendable support with the molten metal. Alternatively, the support may comprise a refractory support which is dimensioned and configured to be open both to flow of molten parent metal from the mold to the receptacle, and to growth of the oxidation reaction product from the receptacle into the mold cavity.

The following terms, as used herein and in the claims, have the stated meanings.

"Ceramic" is not to be unduly construed as being limited to a ceramic body in the classical sense, that is, in the sense that it consists entirely of non-metallic and inorganic materials, but, rather, it refers to a body which is predominantly ceramic with respect to either composition or dominant properties, although the body may contain minor or substantial amounts of one or more metallic constituents derived from the parent metal, or reduced from the oxidant or a dopant, most typically within a range of from about 1–40% by volume, but may include still more metal.

"Oxidation reaction product" generally means one or more metals in an oxidized state wherein a metal has given up electrons to or shared electrons with another element, compound, or combination thereof. Accordingly, an "oxidation reaction product" under this definition includes the product of reaction of one or more metals with an oxidant such as described in this application.

"Vapor-phase oxidant" (sometimes simply "oxidant"), means one or more suitable electron acceptors or electron sharers which are in the form of a gas (vapor) at the process conditions.

"Parent metal" refers to that metal, e.g., aluminum, which is the precursor for the polycrystalline oxidation reaction product, and includes that metal as a relatively pure metal, a commercially available metal with impurities and/or alloying constituents, or an alloy in which that metal precursor is the major constituent; and when a specified metal is mentioned as the parent metal, e.g., aluminum, the metal identified should be read with this definition in mind unless indicated otherwise by the context.

BRIEF DESCRIPTION OF THE DRAWINGS

FIG. 2 is an elevation view in cross section of an assembly in accordance with one embodiment of the present invention, including a shaped parent metal covered with a permeable material and supported above a receptacle;

DETAILED DESCRIPTION OF THE DRAWINGS

Figure 1:
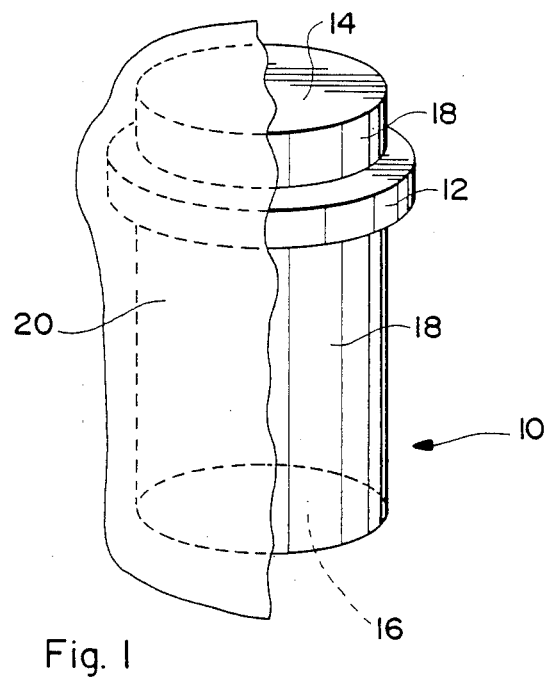
FIG. 1 is a perspective view showing an intermediate stage in the application of a permeable material to a shaped parent metal, one of the steps of a method in accordance with one embodiment of the invention.

Referring now to FIG. 1, there is shown a shaped parent metal generally indicated at 10 which is of generally circular cylindrical configuration (but may be of any suitable configuration) and has an annular land 12 extending about the circumference thereof, closer to end surface 14 than to end surface 16. The major, cylindrical shaped surface of parent metal 10 is indicated at 18. End surface 14, cylindrical shaped surface 18 and the surfaces of annular land 12 jointly comprise the pattern section of shaped parent metal 10; end surface 16 comprises the non-pattern section of shaped parent metal 10.

Figure 2A:
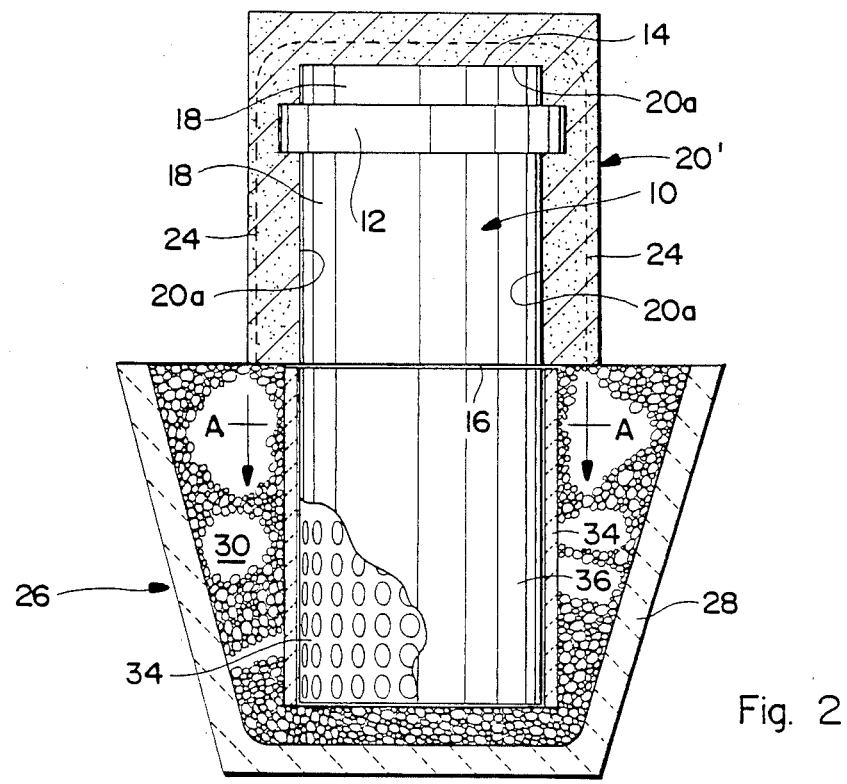
FIG. 2A is a section view taken along line A—A of FIG. 2.
Figure 2A:
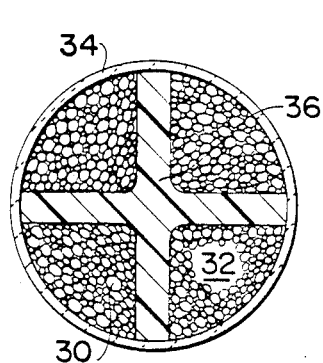
Figure 3:
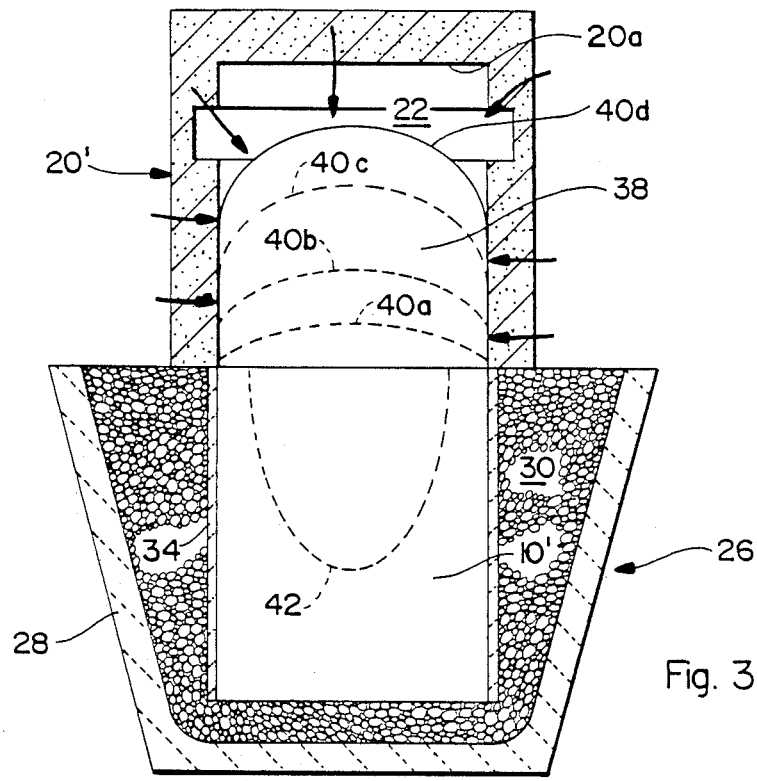
FIG. 3 is a view corresponding to FIG. 2 showing a later stage in the method.

In FIG. 1, approximately a longitudinal one-half of the pattern section of shaped parent metal 10 is shown with a permeable, conformable material 20 applied thereto. As used herein and in the claims, characterization of material 20 as being "permeable" means that it, and the retainer 20' obtained therefrom and described below, are permeable to the passage of a vapor-phase oxidant, such as air, therethrough. The application of permeable material 20 is continued until the entire pattern section of shaped parent metal 10 is covered with the permeable material to a desired thickness, leaving only the non-pattern section comprised of end surface 16 uncovered. Permeable material 20 is coated or applied onto the pattern section of shaped parent metal 10 so as to form in material 20 a shaped surface 20a (FIG. 2) which, when parent metal 10 is removed, as described below, from the mold 20' (FIGS. 2 and 3) obtained by hardening or setting of permeable material 20, will define a mold 22 (FIG. 3), the cavity of which replicates the pattern section. With the entire pattern section (i.e., surfaces 14, 18, and the surfaces of annular land 12) covered by permeable material 20, the latter is allowed to set, or is otherwise hardened by treatment such as heating or firing, to sinter or self-bond permeable material 20. For example, permeable material 20 may comprise a barrier material such as plaster of paris containing a combustible organic, or a mixture of such plaster of paris and calcium silicate, which, when set and then heated, is permeable to air or the gaseous oxidant. Permeable material 20 may also comprise a particulate filler material admixed with a suitable binder to provide green strength, which is applied and adhered to the pattern section and then hardened or set to form the mold 20' as shown in FIGS. 2 and 3. Permeable material 20, or at least a portion thereof which will form the support zone, indicated by dash line 24 in FIG. 2, of mold 20', is an intrinsically self-bonding material. Consequently, upon melting of shaped parent metal 10 and evacuation of it from mold 20', the mold, or at least the support zone 24 thereof, which defines shaped surface 20a, retains its structural integrity. The entirety of mold 20' may be made of such intrinsically self-bonding material or, optionally, only an inner zone need be made of such self-bonding material. For example, a first layer of permeable material, which provides the interior of the mold, is intrinsically self-bonding, followed by a second or outer layer of permeable material which need not be intrinsically self-bonding. As used herein and in the claims, the quality of being "intrinsically self-bonding" simply means that the material will retain sufficient structural integrity under the process conditions of heating to melt shaped parent metal 10 and evacuate it from mold 20, and oxidation of the molten metal, to allow growth of oxidation reaction product into mold 22 (FIG. 3). The shaped surface 20a thereof will, in other words, retain its shape and not slump, sag, or collapse under the conditions of the process.

In some embodiments of the invention, the permeable material 20 as filler is agglomerated or shaped with a suitable vehicle or binder which, upon heating to melt parent metal 10, will be vaporized. The filler left behind, at least the filler within the support zone indicated by dash line 24 in FIG. 2, loosely sinters or self-bonds in order to provide sufficient cohesive strength to mold 20' to retain the integrity of shaped surface 20a thereof.

A suitable container, vessel, or boat, generally indicated at 26, comprises a refractory or metal vessel 28 within which is contained a retainer bed 30. Retainer bed 30 has formed thereon a cylindrical-shaped recess 32, the volume of which is sufficient to contain all the molten metal produced by the melting of shaped parent metal 10. Retainer bed 30 may comprise a particulate material which is inert under the process conditions to the oxidation reaction of molten parent metal. For example, at process temperatures of 1250° C. where aluminum alloy is employed as the parent metal and air is employed as the oxidant, E1 Alundum grain supplied by Norton Company is a suitable retainer bed. This means that oxidation reaction product obtained by oxidation of molten parent metal will not penetrate into retainer bed 30 and that oxidation reaction will not proceed through bed 30. Recess 32, as the receptacle for the molten metal, may be formed within retainer bed 30 by agglomerating the particles of retainer bed 30, or, as illustrated in FIG. 2, by providing an appropriately shaped and refractory structural retainer 34, such as a tube of stabilized zirconia, alumina, or the like. Retainer 34 may be perforated, for reasons set forth below.

An expendable support means 36 is placed within tube-shaped retainer 34 and extends from the bottom to the top (as viewed in FIG. 2) of recess 32. As seen in FIG. 2A, expendable support means 36, which may comprise a molded organic material which will vaporize upon melting of the shaped parent metal, is of cruciform configuration in cross section. It will be observed that the support may be of any suitable configuration or may be an essentially solid block. Support means 36 serves to support the weight of shaped parent metal 10 when it and mold 20' are placed upon the top surface (as viewed in FIG. 2) of retainer bed 30, with shaped parent metal 10 coaxially aligned with cylindrical shaped recess 32. It will be appreciated that some support for shaped parent metal 10 may be necessary to prevent it from tearing loose from mold 20' by its own weight, thereby destroying or damaging surface 20a and falling into recess 32. This is all the more likely if mold 20' is formed of a material of only green strength which will not fully harden until heated to an elevated temperature. In the illustrated embodiment, the orienting of shaped parent metal 10 with receptacle 26 is carried out by placing shaped parent metal 10 upon expendable support 36.

It will be appreciated that other expedients may be utilized to support shaped parent metal 10. For example, tube-shaped retainer 34 may be of a suitably strong refractory material, e.g., it may comprise a tube of wall thickness great enough to support the weight of shaped parent metal 10 and mold 20'. The tube-shaped retainer has an inside diameter slightly smaller than that of shaped parent metal 10 so that the parent metal seats on the marginal edge of the retainer thereby supporting the metal and eliminating the need for an expendable support means 36. The tube-shaped retainer, being refractory, thus serves as a useful support means.

The assembly of FIG. 2 is heated, for example, by being placed within a furnace vented to permit circulation of air as oxidant therethrough.

Upon heating of the assembly to a temperature region above the melting point of the parent metal but below the melting point of the oxidation reaction product to be formed therefrom, shaped parent metal 10 melts and flows into recess or receptacle 32, thereby evacuating mold 20' to leave behind a shaped mold cavity 22 (FIG. 3). Expendable support means 36 is combusted or vaporized, preferably as the molten metal contacts the support, and the vapors escape through tube-shaped retainer 34 and into retainer bed 30 and to the atmosphere. In this way, molten parent metal replaces the evacuating expendable support material. The expendable support materials which may be used in the present invention include those materials which have been used in conventional expendable casting techniques. Although various expendable grade waxes or wax blends are suitable for certain embodiments, expanded plastics and foams are preferred. More preferably, polystyrenes, polyethylenes, and polyurethanes are used as the pattern materials from which the expendable supports are made.

The expendable support may be shaped from such materials by conventional processes including injection molding, blow molding, extrusion, casting, machining and the like. Injection molding is currently preferred for making large numbers of expendable supports. Blow molding may be preferred in certain cases for its ability to produce hollow expendable supports. Blow molding may be particularly desirable because it often minimizes the amount of expendable material required for a given support, thereby facilitating a more rapid evacuation of the recess 32.

The body of molten parent metal obtained by melting shaped parent metal 10 may fill or nearly fill recess 30. During this melting phase, it may be desirable to prevent oxidation of molten parent metal within mold 20'. If so, the furnace may be provided with an inert or non-oxidizing (under the conditions utilized) atmosphere, such as argon or nitrogen. Alternatively, mold 20' may be temporarily enclosed within a removable, impermeable container, such as a stainless steel container loosely fitted over the exterior of mold 20'. With the molten parent metal within recess 32, oxidation of the molten parent metal (upon introduction of the oxidizing atmosphere if not already present) takes place and growth of oxidation reaction product will commence from the body of molten parent metal contained within recess 32 upwardly into the mold cavity 22 (FIG. 3) of mold 20'. As described in Commonly Owned U.S. Pat. No. 4,713,360, mentioned above, heating of the parent metal, e.g., aluminum, in the presence of a vapor-phase oxidant, e.g., air, to the specified temperature range above the melting point of the parent metal but below the melting point of its oxidation reaction product causes the molten parent metal to react with the vapor-phase oxidant to form the oxidation reaction product. Formation of this product will occur at the top of the body of molten parent metal within receptacle 26. Accordingly, the oxidation reaction product is maintained in contact with, and extending between, the body of molten parent metal below it and the vapor-phase oxidant above it, to progressively draw molten metal from the body of molten metal through the oxidation reaction product and into the mold cavity 22. Oxidation reaction product, therefore, continues to form at the interface between the vapor-phase oxidant and previously formed oxidation reaction product. FIG. 3 indicates, by the unnumbered arrows, the penetration of the vapor-phase oxidant through permeable mold 20' and into contact with the surface of the growing oxidation reaction product 38. Continuous formation of additional oxidation reaction product at the interface 40d between the vapor-phase oxidant and previously formed oxidation reaction product 38 thus occurs. Earlier stages of growth of oxidation reaction product 38 are shown by dotted lines 40a, 40b, and 40c. The body 10' of molten parent metal has been depleted by the formation of oxidation reaction product 38 and is hollow at its center as indicated by the dash lines 42 in FIG. 3. Molten metal continues to be drawn upwardly along the sides of recess 32 and drawn through oxidation reaction product 38 to interface 40d so long as reaction conditions are maintained and until mold cavity 22 is filled with oxidation reaction product. Mold 20' may be made of a barrier material whereby shaped surface 20 inhibits further growth of the oxidation reaction product so that the shape of the ceramic body comprised of the oxidation reaction product is determined by the shape of shaped surface 20a.

A barrier means as described in Commonly Owned U.S. Pat. No. 4,923,832, which issued on May 8, 1990, from U.S. patent application Ser. No. 861,024, filed on May 8, 1986, in the names of Marc S. Newkirk et al., and entitled "Method of Making Shaped Ceramic Composites with the Use of a Barrier", may be used as the permeable material in order to inhibit growth or development of the growth of the oxidation reaction product at the shaped surface defining the mold cavity. This barrier facilitates the formation of a ceramic body with boundaries defined by the mold cavity. Suitable barrier means may be any material, compound, element, composition, or the like, which, under the process conditions of this invention, maintains its integrity, is not volatile, and is permeable to the vapor-phase oxidant while being capable of locally inhibiting, poisoning, stopping, interfering with, preventing, or the like, continued growth of oxidation reaction product. Suitable barriers, as, for example, in the case of employing aluminum as parent metal and air as an oxidant, include calcium sulfate (plaster of paris), calcium silicate, and Portland cement, and mixtures thereof. These barrier materials may also include a suitable combustible or volatile material that is eliminated on heating, or a material which decomposes on heating, in order to increase the porosity and the permeability of the barrier means to the vapor-phase oxidant. Still further, the barrier means may include a suitable refractory particulate to reduce any possible shrinkage or cracking which otherwise may occur during the process on heating.

In one preferred embodiment of the invention, the barrier means includes an admixture of calcium sulfate (i.e., plaster of paris) and Portland cement or calcium silicate. The Portland cement or the calcium silicate may be mixed with the plaster of paris in a ratio of 10:1 to 1:10, with the preferred ratio of Portland cement to plaster of paris being about 1:3, and of calcium silicate to plaster of paris being about 1:1. Where desired, Portland cement may be used alone as the barrier material.

Another preferred embodiment, when using aluminum parent metals, comprises plaster of paris admixed with silica, preferably in a stoichiometric amount, but there can be an excess of plaster of paris. During processing, the plaster of paris and silica react to form calcium silicate, which results in a particularly beneficial barrier in that it is substantially free of fissures. In still another embodiment, the plaster of paris is admixed with about 25-40 weight percent calcium carbonate. On heating, the calcium carbonate decomposes emitting carbon dioxide, thereby enhancing the porosity and therefore the permeability of the barrier means.

If desired, the quantity of molten parent metal within recess 32 may be replenished from a reservoir of molten parent metal, for example, by a pipe or conduit passed through retainer bed 30 and connected to an opening in retainer 34 for flowing of replenishment molten parent metal into recess 32. Such replenishment of the supply of molten parent metal in recess 32 may help in some cases to facilitate growth of the oxidation reaction product as well as help to support oxidation reaction product 38 within mold cavity 22. However, even if such reservoir replenishment technique (which is disclosed in Commonly Owned U.S. Pat. No. 4,900,699, which issued on Feb. 13, 1990, from U.S. patent application Ser. No. 908,067, filed Sept. 16, 1986, in the names of Marc S. Newkirk et al., and entitled "Reservoir Feed Method of Making Ceramic Composite Structures and Structures Made Thereby") is not employed, oxidation reaction product 38 will tend to be retained within mold cavity 22 of mold 20', because its growth into contact with the shaped surface 20a provides a "good fit" even if surface 20a comprises a barrier material. Further, the configuration of mold cavity 22, such as the provision of the annular-shaped chamber corresponding to land 12 of shaped parent metal 10 (FIG. 1), will tend to mechanically engage oxidation reaction product 38 in place.

When the growth of oxidation reaction product 38 has substantially entirely filled mold cavity 22, the assembly is allowed to cool and the resultant ceramic body, which has the shape imparted to it by having grown to, but not substantially beyond, the shaped surface 20a of mold cavity 22, is recovered by destruction and removal of mold 20'. The resultant ceramic body will have a shape substantially identical to that of shaped parent metal 10 shown in FIG. 1. The ceramic body may be cut or machined along a surface thereof generally corresponding to end surface 16 of shaped parent metal 10 in order to remove any adherent resolidified parent metal, or any protruding or uneven projections of oxidation reaction product.

As disclosed in the aforesaid Commonly Owned U.S. Pat. No. 4,713,360, the resultant ceramic body is comprised of a polycrystalline oxidation reaction product and may have interconnected or isolated metallic constituents, including, for example, non-oxidized parent metal constituents, therein. It may also contain some voids or porosity.

It will be appreciated that a significant advantage of the present invention is the fact that a shaped parent metal body of any desired shape may readily be made by any appropriate means. For example, a piece of metal such as a bar, billet, or ingot may be machined, or the metal may be cast, molded, extruded or otherwise shaped to provide the shaped body of parent metal. Grooves, bores, recesses, lands, bosses, flanges, studs, screw threads, and the like may be formed therein and/or collars, bushings, discs, bars or the like may be assembled thereto to provide a desired shaped parent metal body. It will be appreciated that it is much easier to so work and/or assemble metal components than it would be to machine the desired shape from a blank ceramic body, particularly if the desired shape is a complex one.

Figure 4:
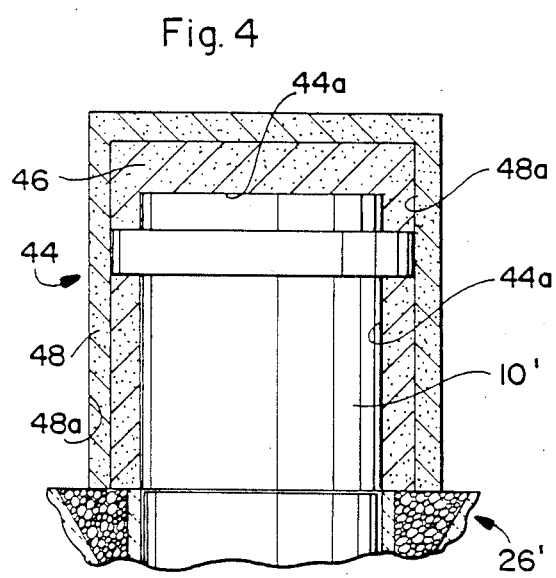
FIG. 4 is a partial view corresponding to that of FIG. 2 but showing another embodiment of the invention.

FIG. 4 shows an alternate embodiment of the invention in which a container 26' identical to container 26 of FIG. 2 is provided and in which mold means 44 comprises an inner section 46 and an outer section 48. Inner section 46 is provided by a first permeable, conformable material applied to shaped parent metal 10' to provide a shaped surface 44a of mold 44. Inner section 46 comprises a suitable filler mixed in an appropriate vehicle or binder to permit application of the resultant agglomerated filler to shaped parent metal 10'. When inner section 46 has hardened or set, a second layer of permeable conformable material is applied to it to provide outer section 48 which may comprise, for example, plaster of paris and calcium silicate mixture and thus serve as a barrier material. Both the agglomerated filler comprising inner section 46 and the barrier material comprising outer section 48 are permeable so as to permit a vapor-phase oxidant to pass therethrough. The filler of inner section 46, or at least a support zone thereof corresponding to the support zone indicated by dash line 24 of FIG. 2, is intrinsically self-bonding so that, upon heating and loss or vaporization of the binder, the filler particles self-bond to provide sufficient cohesive strength to maintain the integrity of shaped surface 44a as parent metal 10' melts and flows into the receptacle 26'.

Upon growth of the oxidation reaction product in a manner identical to that illustrated and described with respect to FIG. 3, the growing oxidation reaction product will infiltrate and embed the filler of inner section 46 and will grow to the inner surface 48a of outer section 48. Commonly Owned U.S. Pat. No. 4,851,375, which issued on Jul. 25, 1989, from U.S. patent application Ser. No. 819,397, filed Jan. 17, 1986, in the names of Marc S. Newkirk et al. and entitled "Composite Ceramic Articles and Methods of Making Same", discloses that the growth of a polycrystalline material resulting from the oxidation of a parent metal can be directed towards and into a permeable mass of filler material which is infiltrated and embedded within the growing polycrystalline material to provide a composite ceramic structure. The filler may comprise various refractory and/or non-refractory granular, fibrous, or other materials including ceramic fillers. The resulting composite materials comprise a dense matrix of a ceramic polycrystalline oxidation reaction product embedding the filler. The filler comprises either a loose or bonded array or arrangement of materials, which array has interstices, openings, intervening spaces, or the like to render it permeable both to the vapor-phase oxidant and to the growth of oxidation reaction product through it. The inner surface 48a of the barrier provided by outer section 48 will inhibit further growth of the oxidation reaction product and, after completion of growth and cooling of the assembly, the ceramic body is recovered by removing or destroying outer section 48.

Figure 5:
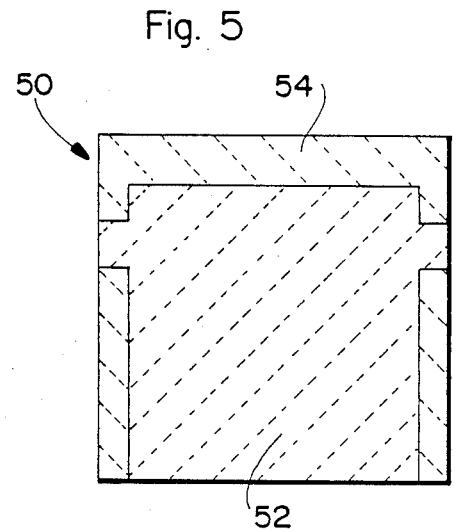
FIG. 5 is a cross-sectional view in elevation of a shaped ceramic body produced by using the assembly of FIG. 4 and comprising an inner segment and an outer, composite segment composed of a matrix embedding a filler.

The resultant ceramic body 50 is illustrated in FIG. 5 and comprises an inner segment 52 and an outer segment 54. Inner segment 52 comprises a so-called "air-grown" ceramic, i.e., a ceramic grown not into a filler but into a volume or space occupied only by air or another vapor-phase oxidant. Accordingly, inner segment 52 does not contain a filler embedded therein. Outer segment 54 comprises a ceramic composite, i.e., the ceramic material embeds a filler which may comprise, for example, ceramic particles, whiskers, or the like. Where desired, the setup may be arranged so that the longitudinal facing of the annular land is flush with, or protrudes slightly beyond, the exterior surface of inner section 46. In this manner, the longitudinal facing in the end product is exposed thereby providing different wear surface properties from the remainder of the exterior surfaces.

As explained in the Commonly Owned Patents and Patent Applications, the addition of dopant materials to the parent metal can favorably influence or promote the oxidation reaction process. The function or functions of the dopants can depend upon a number of factors other than the dopant material itself. These factors include, for example, the particular parent metal, the end product desired, the particular combination of dopants when two or more dopants are used, the concentration of the dopant, the oxidizing environment, and the process conditions. For example, certain dopants require the presence of other dopants to operate successfully.

The dopant or dopants may be provided as alloying constituents of the parent metal, or applied to an external surface of the shaped parent metal, preferably particle or powder form. When a filler material is employed such as described in connection with FIG. 4, suitable dopants may be applied to or admixed with the filler or a part of the filler, or a suitable filler may comprise a dopant. In the case of the technique where a dopant or dopants are applied to the filler, the application may be accomplished in any suitable manner, such as by dispersing the dopants throughout part or all of the filler as coatings or in particulate form, preferably including the dopant in at least a portion of the filler adjacent the parent metal. Application of any of the dopants to the filler may also be accomplished by applying a layer of one or more dopant materials to and within the bed, including any of its internal openings, interstices, passageways, intervening spaces, or the like, that render it permeable. A convenient manner of applying any of the dopant material is to merely soak the filler to be employed in a liquid source (e.g., a solution of dopant material).

A source of the dopant may also be provided by placing a rigid body of dopant in contact with and between at least a portion of the filler material and the shaped parent metal. For example, a thin sheet of silica-containing glass (useful as a dopant for the oxidation of an aluminum parent metal) can be placed upon a surface of the shaped parent metal, and the gas-permeable, conformable material coated thereover. Additionally or alternatively, one or more of the dopants may be externally applied to the surface of the shaped parent metal. Additionally, dopants alloyed within the parent metal may be augmented by dopant(s) applied by the aforementioned techniques. Thus, any concentration deficiencies of the dopants alloyed within the parent metal may be augmented by an additional concentration of the respective dopant(s) applied in these alternate manners, or vice versa.

Useful dopants for an aluminum parent metal, particularly with air as the oxidant, include, for example, magnesium and zinc, especially in combination with other dopants as described below. These metals, or a suitable source of the metals, may be alloyed into the aluminum-based parent metal at concentrations for each of between about 0.1–10% by weight based on the total weight of the resulting doped metal. The concentration for any one dopant will depend on such factors as the combination of dopants and the process temperature. Concentrations within the appropriate range appear to initiate the ceramic growth, enhance metal transport and favorably influence the growth morphology of the resulting oxidation reaction product.

Other dopants which are effective in promoting poly crystalline oxidation reaction growth, for aluminum-based parent metal systems are, for example, silicon, germanium, tin and lead, especially when used in combination with magnesium or zinc. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1–10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying material to be added at a lower temperature.

Additional examples of dopant materials, useful with an aluminum parent metal, include sodium, lithium, calcium, boron, phosphorus and yttrium, which may be used individually or in combination with one or more other dopants depending on the oxidant and process conditions. Sodium and lithium may be be used in very small amounts in the parts per million range, typically about 100-200 parts per million, and each may be used alone or together, or in combination with other dopant(s). Rare earth elements such as cerium, lanthanum, praseodymium, neodymium and samarium are also useful dopants, and herein again especially when used in combination with other dopants.

As noted above, it is not necessary to alloy any dopant material into the parent metal. For example, one or more dopant materials may be applied in a thin layer to either all or a portion of the surface of the parent metal or the corresponding surface of the support body. Such layer of dopant material may be applied by painting, dipping, silk screening, evaporating, or otherwise applying the dopant material in liquid or paste form, or by sputtering, or by simply depositing a layer of a solid particulate dopant or a solid thin sheet or film of dopant onto the surface of the parent metal or the support body. The dopant material may, but need not, include either organic or inorganic binders, vehicles, solvents, and/or thickeners. More preferably, the dopant material is applied as a powder to the surface of the support body or parent metal with a glue or binder which will be eliminated with the support body during processing. One particularly preferred method of applying the dopants is to utilize a liquid suspension of the dopants in a water/organic binder mixture sprayed onto a surface in order to obtain an adherent coating which facilitates handling of the shaped metal or support body prior to processing.

Dopant materials when used externally are usually applied to at least a portion of the appropriate surface of the support body or parent metal as a uniform coating thereon. The quantity of dopant is effective over a wide range relative to the amount of parent metal to be reacted, and, in the case of aluminum, experiments have failed to identify either upper or lower operable limits. For example, when utilizing silicon in the form of silicon dioxide externally applied as a dopant for an aluminum-magnesium parent metal using air or oxygen as the oxidant, quantities as low as 0.00003 gram of silicon per gram of parent metal, or about 0.0001 gram of silicon per square centimeter of parent metal surface on which the $SiO_2$ dopant is applied, are effective. It also has been found that a ceramic structure is achievable from an aluminum-silicon parent metal using air or oxygen as the oxidant by using MgO as a dopant in an amount greater than about 0.0008 gram of Mg per gram of parent metal to be oxidized and greater than about 0.003 gram of Mg per square centimeter of parent metal surface upon which the MgO is applied.

The invention is further illustrated by the following Example.

EXAMPLE

A cylindrical body of aluminum (alloy 380.1, from Belmont Metals, having a nominally identified composition by weight of 8-8.5% Si, 2-3% Zn, and 0.1% Mg as active dopants, and 3.5% Cu as well as Fe, Mn, and Ni but the actual Mg content was sometimes higher as in the range of 0.17-0.18%), measuring 3 inches in diameter and ½ inch thick, having an intermediately disposed aperture 1 inch in diameter, was placed onto a cylindrically shaped expendable support body comprised of expanded, cellular poly styrene measuring 3-½ inches in diameter and ⅜ inch thick, which had a thin layer of silica dopant material (Minusil, 30 micron, from PGS) thereon such that the dopant was between the metal and support. A conformable, gas-permeable material comprising an admixture of 30 weight percent plaster of paris (Bondex, from Bondex, Inc.), 70 weight percent Wollastonite (a mineral calcium silicate, from Nyco Inc., FP grade), and water to form a workable paste, was applied to the pattern section of the metal, and additionally was applied to all exposed portions of the support body except the bottom. The pattern section of the metal comprised the top, side and aperture. The applied admixture was allowed to set such that the plaster of paris would hydrolyze, thus forming a support zone adjacent to the pattern section of the metal. This aggregation of metal, support body, and gas-permeable material was buried in a bed of Wollastonite contained by a refractory vessel.

The above setup was placed in a furnace supplied with air and heated up over 5 hours to 1000° C. The furnace was held at 1000° C. for 100 hours, and then cooled down to ambient over 5 hours.

The shaped ceramic body was recovered, and the conformable, gas-permeable material was removed by light sand blasting. The resulting ceramic body replicated the pattern section of the precursor metal including the aperture.

What is claimed is:

1. A method for producing a shaped, self-supporting ceramic body, the method comprising:
    (a) providing a shaped parent metal comprising a material selected from the group consisting of aluminum, silicon, titanium, tin, zirconium, and hafnium, said parent metal further comprising at least one dopant and having a pattern section;
    (b) applying to said pattern section a conformable, gas-permeable material selected from the group consisting of plaster of paris, Portland Cement, calcium silicate, and mixtures thereof, at least a portion of which function as a barrier to growth of oxidation reaction product to provide a mold having a shaped surface which is substantially congruent to said pattern section, said material being, at least under the processing conditions defined in following steps (d) and (e), self-bonding, at least in a support zone thereof immediately adjacent to and coextensive with said surface, to provide said mold with sufficient cohesive strength to retain the integrity of said shaped surface under the processing conditions defined in following steps (d) and (e);
    (c) orienting said parent metal and a receptacle to place said parent metal in flow communication with said receptacle, the capacity of said receptacle being at least sufficient to accommodate substantially all of said parent metal in molten form;
    (d) heating said parent metal to a temperature region above its melting point but below the melting point of its oxidation reaction product and evacuating the resulting molten parent metal from said mold into said receptacle to provide a mold cavity;
    (e) continuing said heating in the presence of a vapor-phase oxidant and, in said temperature region,
        (i) reacting the molten parent metal with said oxidant to form an oxidation reaction product,
        (ii) maintaining at least a portion of said oxidation reaction product in contact with and between said body of molten metal and said oxidant, to progressively draw molten metal from said body through the oxidation reaction product and into said mold for contact with said oxidant so that oxidation reaction product continues to form within said mold at the interface between the oxidant and previously formed oxidation reaction product, and (iii) continuing said reaction to grow said oxidation reaction product into contact with said shaped surface, thereby forming a ceramic body whose shape is determined by the shape of said mold cavity, and (f) recovering said ceramic body from said mold.

2. A method for producing a shaped, self-supporting ceramic body, the method comprising:

(a) providing a shaped parent metal comprising a material selected from the group consisting of aluminum, silicon, titanium, tin, zirconium, and hafnium, said parent metal further comprising at least one dopant and having a pattern section;

(b) applying to said pattern section a conformable, gas-permeable material selected from the group consisting of plaster of paris, Portland Cement, calcium silicate, and mixtures thereof, at least a portion of which function as a barrier to growth of oxidation reaction product to provide a mold having a shaped surface which is substantially congruent to said pattern section, said material being, at least under the processing conditions defined in following steps (d) and (e), self-bonding, at least in a support zone thereof immediately adjacent to and coextensive with said surface, to provide said mold with sufficient cohesive strength to retain the integrity of said shaped surface under the processing conditions defined in following steps (d) and (e);

(c) orienting said parent metal and a receptacle to place said parent metal in flow communication with said receptacle, the capacity of said receptacle being at least sufficient to accommodate substantially all of said parent metal in molten form;

(d) heating said parent metal to a temperature region above its melting point but below the melting point of its oxidation reaction product and evacuating the resulting molten parent metal from said mold into said receptacle to provide a mold cavity;

(e) continuing said heating in the presence of a vapor-phase oxidant comprising oxygen and, in said temperature region, (i) reacting the molten parent metal with said oxidant to form an oxidation reaction product, (ii) maintaining at least a portion of said oxidation reaction product in contact with and between said body of molten metal and said oxidant, to progressively draw molten metal from said body through the oxidation reaction product and into said mold for contact with said oxidant so that oxidation reaction product continues to form within said mold at the interface between the oxidant and previously formed oxidation reaction product, and (iii) continuing said reaction to grow said oxidation reaction product into contact with said shaped surface, thereby forming a ceramic body whose shape is determined by the shape of said mold cavity, and (f) recovering said ceramic body from said mold.

3. The method of claim 1, wherein said temperature region is from about 850° C. to 1450° C.

4. The method of claim 2, wherein said temperature region is from about 850° C. to 1450° C.

5. The method of claim 1, wherein said material comprises a filler which is permeable to growth of said oxidation reaction product therethrough, and including growing said oxidation reaction product beyond said shaped surface and into said filler to embed at least a portion of said filler within said oxidation reaction product, whereby said shaped ceramic body comprises an inner segment whose shape is determined by the shape of said mold cavity and an outer composite segment embedding said filler.

6. The method of claim 2, wherein said material comprises a filler which is permeable to growth of said oxidation reaction product therethrough, and including growing said oxidation reaction product beyond said shaped surface and into said filler to embed at least a portion of said filler within said oxidation reaction product, whereby said shaped ceramic body comprises an inner segment whose shape is determined by the shape of said mold cavity and an outer composite segment embedding said filler.

7. The method of claim 5 including applying a barrier material to the surface of said filler oppositely disposed to said shaped surface, thereby inhibiting growth of said oxidation reaction product at said barrier material.

8. The method of claim 5, wherein said filler comprises a material selected from the group consisting of granules, particulates, powders, fibers, whiskers, aggregate, pellets, tubes, refractory fiber cloth, tubules, or mixtures thereof.

9. The method of claim 7, wherein said filler comprises a material selected from the group consisting of granules, particulates, powders, fibers, whiskers, aggregate, pellets, tubes, refractory fiber cloth, tubules, or mixtures thereof.

* * * * *